US012801786B2

(12) United States Patent
Townsend

(10) Patent No.: US 12,801,786 B2
(45) Date of Patent: *Nov. 17, 2026

(54) PRIVACY PRESERVING DATA PROCESSING IN A LINKED DATA OPERATING ENVIRONMENT USING PRIVACY PRESERVING DATA PROCESSING (PPDP) AGENTS

(71) Applicant: Inrupt, Inc., Boston, MA (US)

(72) Inventor: Emmet Townsend, Boston, MA (US)

(73) Assignee: Inrupt, Inc., Boston, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 19/193,359

(22) Filed: Apr. 29, 2025

(65) Prior Publication Data

US 2025/0322100 A1 Oct. 16, 2025

Related U.S. Application Data

(63) Continuation-in-part of application No. 19/050,487, filed on Feb. 11, 2025, which is a continuation of application No. 18/380,690, filed on Oct. 17, 2023, now Pat. No. 12,223,090, which is a continuation of application No. 18/107,414, filed on Feb. 8, 2023, now Pat. No. 11,790,115.

(51) Int. Cl.

*G06F 21/62* (2013.01)
*G06F 21/33* (2013.01)

(52) U.S. Cl.

CPC .......... *G06F 21/6245* (2013.01); *G06F 21/33* (2013.01)

(58) Field of Classification Search

CPC ............................ G06F 21/6245; G06F 21/33
USPC ........................................................ 726/28
See application file for complete search history.

(56) References Cited

U.S. PATENT DOCUMENTS

2019/0229887 A1* 7/2019 Ding .................... H04L 9/0816
2026/0044596 A1* 2/2026 Bakshi ................. G06F 21/552

* cited by examiner

*Primary Examiner* — Jacob Lipman
(74) *Attorney, Agent, or Firm* — David H. Judson

(57) ABSTRACT

A method for privacy preserving data processing in a linked data operating environment. The method begins by creating a privacy preserving data processing (PPDP) agent for use by an Artificial Intelligence (AI) agent. The PPDP agent is configured to access and process private data that the AI requires but is not authorized to access. In use, a secure PPDP environment is instantiated in association with one or more private data stores and in which the PPDP agent is then configured to execute. Under the control of the AI agent, the PPDP agent is then executed within the secure PPDP environment over a configured security context and life-cycle of the PPDP agent to access and process the private data on the AI agent's behalf.

16 Claims, 10 Drawing Sheets

PRIVACY PRESERVING DATA PROCESSING IN A LINKED DATA OPERATING ENVIRONMENT USING PRIVACY PRESERVING DATA PROCESSING (PPDP) AGENTS

BACKGROUND

This disclosure relates generally to technologies, products and services for privacy preserving data processing.

The Solid (Linked Data) Ecosystem ("Solid") is a W3C and industry initiative that provides a set of specification that, together, provide applications with secure and permissioned access to externally stored data in an interoperable way. Solid adds to existing Web standards to provide a space where individuals can maintain their autonomy, control their data and privacy, and choose applications and services to fulfil their needs. To this end, the specifications in the ecosystem describe how Solid servers and clients interoperate by using Web communication protocols, global identifiers, authentication and authorization mechanisms, data formats and shapes, and query interfaces. Participants store their data securely in decentralized data stores called Pods (online data stores), which are akin to personal web servers for data. The notion of "personal" in this context is not limited to a human being, as a Pod may be associated with any person, device, object, organization or thing. Thus, e.g., a Pod may be associated with a human user, a company or government agency, a smart vehicle, an Internet-of-Things (IoT) device, a smart home, or other such construct. When data is stored in a participant's Pod, they control which people and applications can access it. Anyone or anything that accesses data in a Solid Pod can do so in one of two ways: using identity, or using an access grant. Typically, an identity is a unique ID, authenticated by a decentralized protocol (e.g., OpenID Connect). An access grant is akin to a key than can be used to open a vault, and a grant can contain any set of claims including an identity. For example, an access grant with a claim providing that a requesting user is employed by the Post Office (even without proof of the requesting user's identity) may be used to gain access to a resource that is only visible to Post Office employees. Solid's access control system uses identity and/or access grants to determine whether a person or application has access to a resource in a Pod. A Solid Server hosts one or more Solid Pods, and each Pod is fully controlled by the Pod Owner, and each Pod's data and access rules are fully distinct from those of other Pods. With Solid's authentication and authorization protocols, the user determines which people and applications can access the user's data. Solid application store and access data in Pods. Within the interoperable Solid ecosystem, different applications can access the same data instead of requiring separate data silos specifically for the applications.

While the above-described ecosystem provides significant advantages, it is desirable to provide the ability for persons or organizations to create "agents" that can operate on behalf of an entity (e.g., an owner of a Pod, a third party organization, or the like) in the context of a Solid Pod.

SUMMARY

This disclosure provides for a method for privacy preserving data processing in a linked data operating environment (e.g., Solid) wherein applications have secure and permissioned access in an interoperable manner to data (e.g., a user's personal data) that is stored in one or more online data stores. The method begins by creating a privacy preserving data processing (PPDP) agent for use by an entity to process the data in association with the one or more online data stores. In a preferred embodiment, the PPDP agent is then subjected to a certification process that ensures that the PPDP agent does not exfiltrate any data from the one or more online data stores. After a successful certification, and following registration of the agent with an agent repository, a secure PPDP environment is instantiated in association with the one or more online data stores and in which the PPDP agent is then configured to execute. The PPDP agent is then executed within the secure PPDP environment over a configured security context and life-cycle of the PPDP agent. At the close of the PPDP agent's life-cycle, or upon a given event, the PPDP agent is terminated and the PPDP environment is closed.

According to this disclosure, an Artificial Intelligence (AI) agent leverages an PPDP agent to facilitate a privacy preserving data processing operation on its behalf in the linked data operating environment.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the disclosed subject matter and the advantages thereof, reference is now made to the following descriptions taken in conjunction with the accompanying drawings, in which.

DETAILED DESCRIPTION

Figure 1:
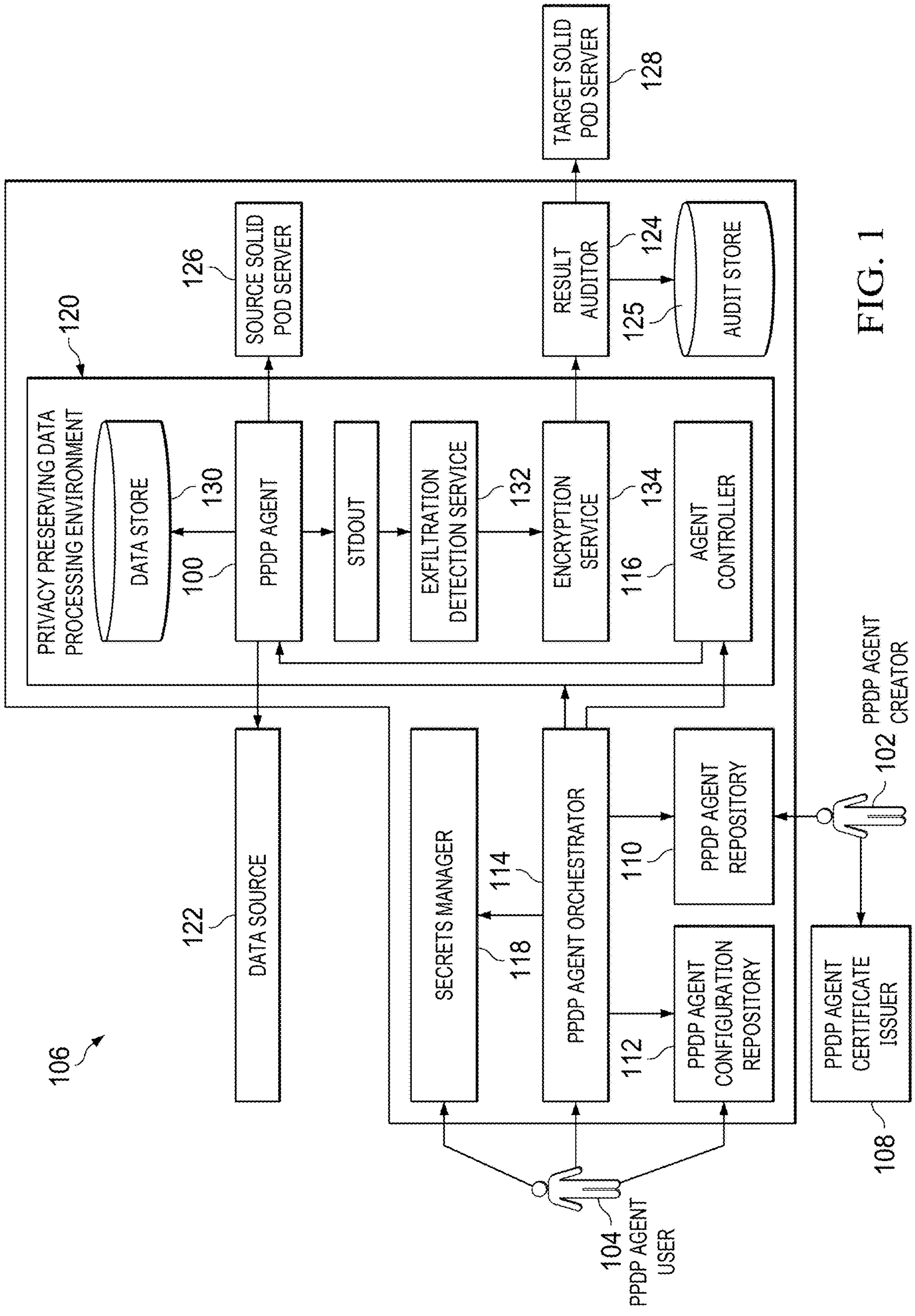
FIG. 1 depicts a representative Solid ecosystem operating environment in which a Privacy Preserving Data Processing (PPDP) Agent is executed within a Privacy Preserving Data Processing (PPDP) Environment according to the techniques of this disclosure.

The reader's familiarity with the Solid Ecosystem is presumed. FIG. 1 depicts a Solid operating environment wherein the techniques of this disclosure are implemented. While the Solid operating environment is preferred, this is not a limitation, as the techniques herein may be practiced in any linked data operating environment wherein applications have secure and permissioned access in an interoperable manner to data (e.g., a user's personal data) that is stored in one or more typically online data stores.

As used herein, and with reference to FIG. 1, the following terms have the following meaning:

PPDP Agent 100—Privacy Preserving Data Processing Agent

A software program that when activated, executes in the context of one or more Solid Pods. A PPDP Agent executes in the context of any Pod that it has permission to access. The software executes in a secure environment such that the data in the Pod is not decrypted except in the trusted execution environment used by the secure environment. Therefore, the data from the Pod is not exposed to any third party. Typically, the PPDP Agent is configured as a set of special-purpose computer program instructions that are executed by one or more hardware processors in one or more computing systems.

PPDP Agent Creator 102

The person or organization that created the PPDP Agent. The PPDP Agent Creator is responsible for submitting the agent for PPDP Agent Certification.

PPDP Agent User 104

The person or organization that registers the PPDP Agent with the PPDP Agent Repository to act on their behalf. The PPDP Agent User manages the secrets that are provided to the PPDP Agent when it is activated in a PPDP Environment.

PPDP Agent Certification 106

PPDP Agent Certification is a process through which a PPDP Agent goes to ensure it does not exfiltrate any data from a Solid Pod.

PPDP Agent Certificate Issuer (ACI) 108

An organization trusted by the parties in a Solid Ecosystem to carry out the PPDP Agent Certification process and issue certificates.

PPDP Agent Repository 110

A PPDP Agent Repository (AR) is a store for certified PPDP Agents that can be activated to execute in a PPDP Environment. A PPDP Agent registered in a PPDP AR can be associated with a set of Terms. A PPDP AR can be replicated to multiple instances to provide redundancy and/or caching close to PPDP Agent Orchestrators and PPDP Environments. Each unique version of a certified PPDP Agent is only stored once in the PPDP AR.

PPDP Agent Configuration Repository 112

A data store used to maintain the configuration provided by a PPDP Agent User for a PPDP Agent. One certified PPDP Agent in the PPDP AR can be referenced by multiple PPDP Agent Configurations.

PPDP Agent Orchestrator 114

Manages the lifecycle of certified PPDP Agents and PPDP Environments

Agent Controller 116

The Agent Controller manages the execution of the PPDP Agent and receives commands from the PPDP Agent Orchestrator.

Secrets Manager 118

Backed by a Hardware Security Module, the Secrets Manager allows the PPDP Agent User to manage the secrets that are provided to the PPDP Agent when it is activated in a PPDP Environment.

PPDP Environment 120

A secure environment in which a PPDP Agent executes. The environment cannot receive incoming network connections. Outbound connections to a Solid Pod Server are allowed but write operations are prevented. Outbound HTTPS connections are allowed to the URIs specified when the executing PPDP Agent was registered with the PPDP Agent Repository and configured in the PPDP Agent Configuration Repository. Preferably, only GET requests are allowed. Standard output from the environment via a standard output device (STDOUT) is written to the Result Audit service. Standard output is a default file descriptor where the process can write output. A PPDP Agent must send its output to the STDOUT.

Data Source 122

A non-Solid HTTP endpoint available over HTTPS that is accessible to the PPDP Agent when executing within a PPDP Environment. Preferably, the endpoint must be specified when the PPDP agent is registered with the PPDP Agent Repository or configured in the PPDP Agent Configuration Repository.

Result Auditor 124

All output from the PPDP Agent is captured and stored by the Result Auditor after being encrypted with an agreed key. The output is also sent to the Pod in the Target Solid Pod Server, specified by the PPDP Agent when it is registered with the PPDP Agent Repository or configured in the PPDP Agent Configuration Repository. Preferably, the results in the Result Auditor can only be decrypted using the agreed key. The decrypted results prove the exact data that was produced by the PPDP Agent. The key management procedure determines which entities are required in order to unlock the key.

Generalizing, the key to decrypt the data can be stored in the secret store, and gaining access to this key may require multiple parties (e.g., using a secret share protocol). That said, there is no requirement that the key used for encryption be the same key that is used for decryption, in which case the decryption key is stored elsewhere, i.e., the decryption key is not available unless it is provided by the PPDP Agent User. In an alternative embodiment, the decryption key can be used by the PPDP Agent User to decrypt the results without ever disclosing the key.

Audit Store 125

A secure data store for the Result Auditor.

Source Solid Pod Server 126

This is the Solid Pod Server the PPDP Agent can read from to get data from Pods. The PPDP Agent must have authorization to read the resources it attempts to access. All supported access methods are permitted including the use of access grants and identity based access.

Target Solid Pod Server 128

This is where the results of the processing are available to the PPDP Agent User. The results are written to the Pod specified by the PPDP Agent when it is configured in the PPDP Agent Configuration Repository.

Data Store 130

A secure data store for the PPDP Agent.

Figure 2:
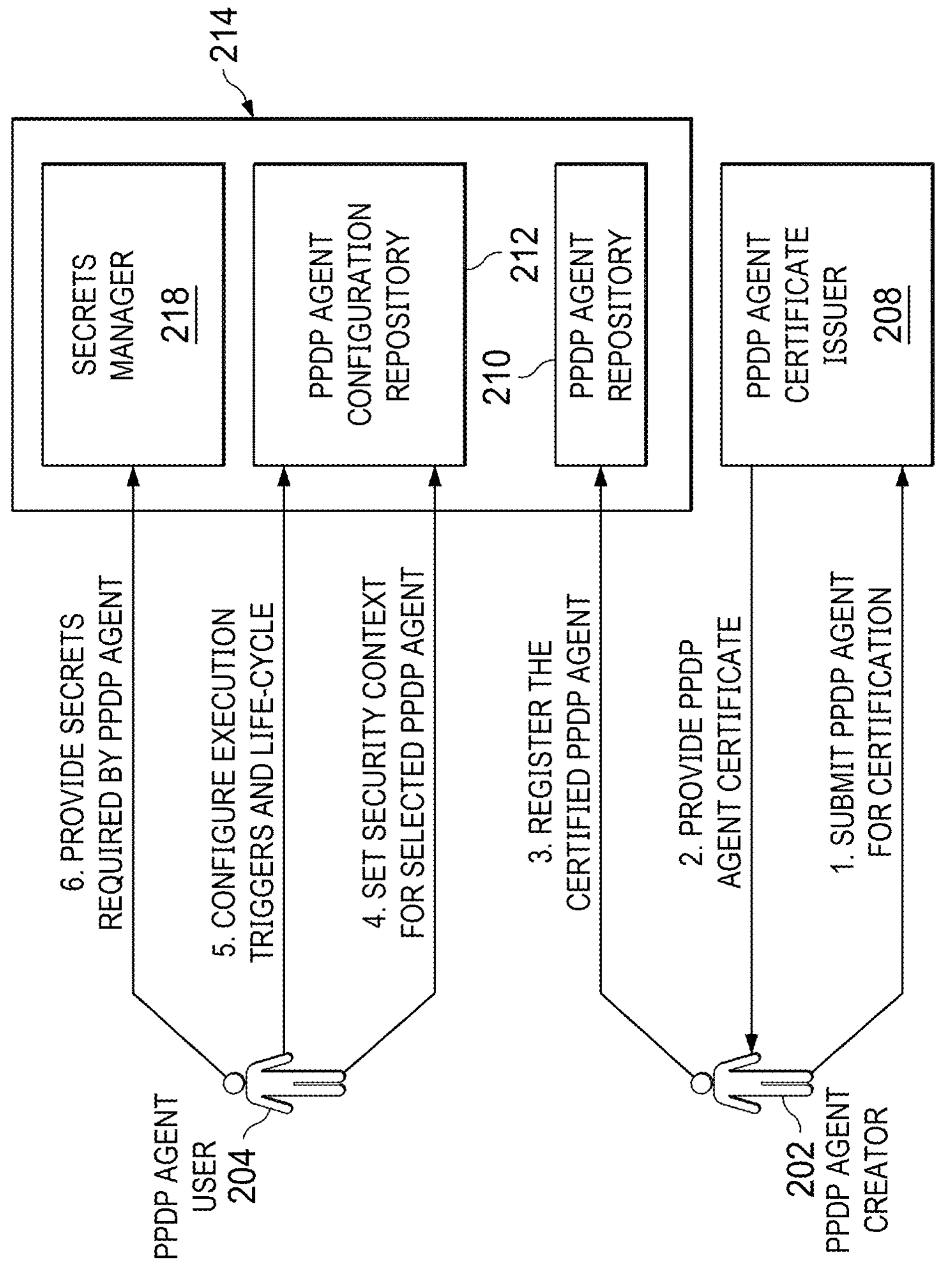
FIG. 2 depicts a process for submitting a PPDP Agent for certification, and how a PPDP Agent user configures a security context and life-cycle of a certified PPDP Agent.

FIG. 2 depicts a setup operation for the PPDP Agent. In the process, the Agent is first certified for use in the PPDP Environment by a PPDP Agent Creator 202; once certified, the PPDP Agent User 204 then configures a security context and life-cycle to enable the PPDP Agent for use in the PPDP Environment. To this end, and at step (1), a PPDP Agent is submitted for certification. In particular, and according to this disclosure, a PPDP Agent must be certified by a recognized PPDP ACI 208 before it can be registered with a PPDP Agent Repository 210. The certification process may include one or more steps. For example, in one step, the PPDP Agent Creator 202 completes and signs a document. This is a legally binding contract between the PPDP Agent Creator and the PPDP ACI where the creator provides guarantees about the type of data processing and the type of data removed from the PPDP Environment. Typically, the PPDP Agent also undergoes static and/or dynamic analysis to identify any potential unauthorized data exfiltration. As a further variant, the PPDP Agent undergoes Artificial Intelligence (AI)-based analysis to identify any potential unauthorized data exfiltration; if the analysis process determines any potential unauthorized data exfiltration by the PPDP Agent, the agent is flagged for inspection by a human. Regardless of which of these steps are used, if the certification process determines the PPDP Agent does not exfiltrate any unauthorized data, a certificate is issued for the PPDP agent at step (2) by the PPDP Agent Certificate Issuer 208. The PPDP Agent Certificate is a Verifiable Credential typically including the following claims and is digitally signed by the PPDP ACI: Issue date, Certification process version, PPDP ACI identifier, PPDP Creator identifier, Expiry date, PPDP Certification Level, PPDP Agent identifier. PPDP Agent version, and PPDP Agent hash.

With reference again to FIG. 2, at step (3), the certified PPDP Agent is registered. This operation involves a PPDP Agent Orchestrator (AO) 214. Preferably, the AO will only use Agents that have been registered with a trusted PPDP Agent Repository (AR) 212. A PPDP AO may be configured to trust multiple PPDP AR in an ecosystem. A PPDP Agent may be registered with multiple different PPDP AR and may use different Terms with each PPDP AR. The PPDP Agent Creator registering a PPDP Agent provides the PPDP AR with information including: PPDP Agent, PPDP Agent Certificate, and PPDP Agent Terms of use that apply to the PPDP Agent User.

Referring back to FIG. 2, at step (4), a security context is set for the PPDP Agent. In particular, preferably, a PPDP Agent User sets the security context for a PPDP Agent before the Agent can be used in a PPDP Environment. The security context can include: a list of data sources the PPDP Agent can read data from (where a data source can be a templated URI containing variables representing secrets from the Secrets Manager); a list of Source Solid Pod Servers the PPDP Agent can read data from (preferably, only read requests are accepted over the connection to any Source Solid Pod Server); a list of Target Solid Pod Servers where the output from the PPDP Agent can be written; and a list of the names of the secrets required by the PPDP Agent. The secrets will be retrieved by the PPDP Agent Orchestrator and made available to the PPDP Agent in the PPDP Environment as environment variables. The list will generally contain at least the credentials to allow the PPDP agent to authenticate with the relevant Identity Provider.

At step (5), one or more execution triggers and life-cycle are configured. The execution triggers determine when the PPDP Agent is executed within the PPDP Environment. Triggers may include: Schedule: a pre-configured schedule determining when the PPDP Agent will be started; and Events: a set of synchronous or asynchronous events that will trigger the starting of the PPDP Agent. The configuration provides the information required to subscribe for the events. Life-cycle is configured as follows. The PPDP Agent Orchestrator 214 can terminate the PPDP Agent at any time. This can be done for reasons including, without limitation, a request by the PPDP Agent User, and operational reasons. The PPDP Agent User can configure what happens when an executing PPDP Agent either completes or crashes. The options include, e.g.: leave the PPDP Environment intact, awaiting another Execute instruction from the PPDP Agent Orchestrator, and terminate the PPDP Environment.

At step (6), secrets required by the PPDP Agent are provided. Typically, all secrets required by the PPDP Agent should be provided by the PPDP Agent User using the Secrets Manager 218. The Secrets Manager must be trusted by the PPDP Agent Orchestrator 214. A PPDP Agent Orchestrator may trust multiple Secrets Managers. This completes the setup process.

Figure 3:
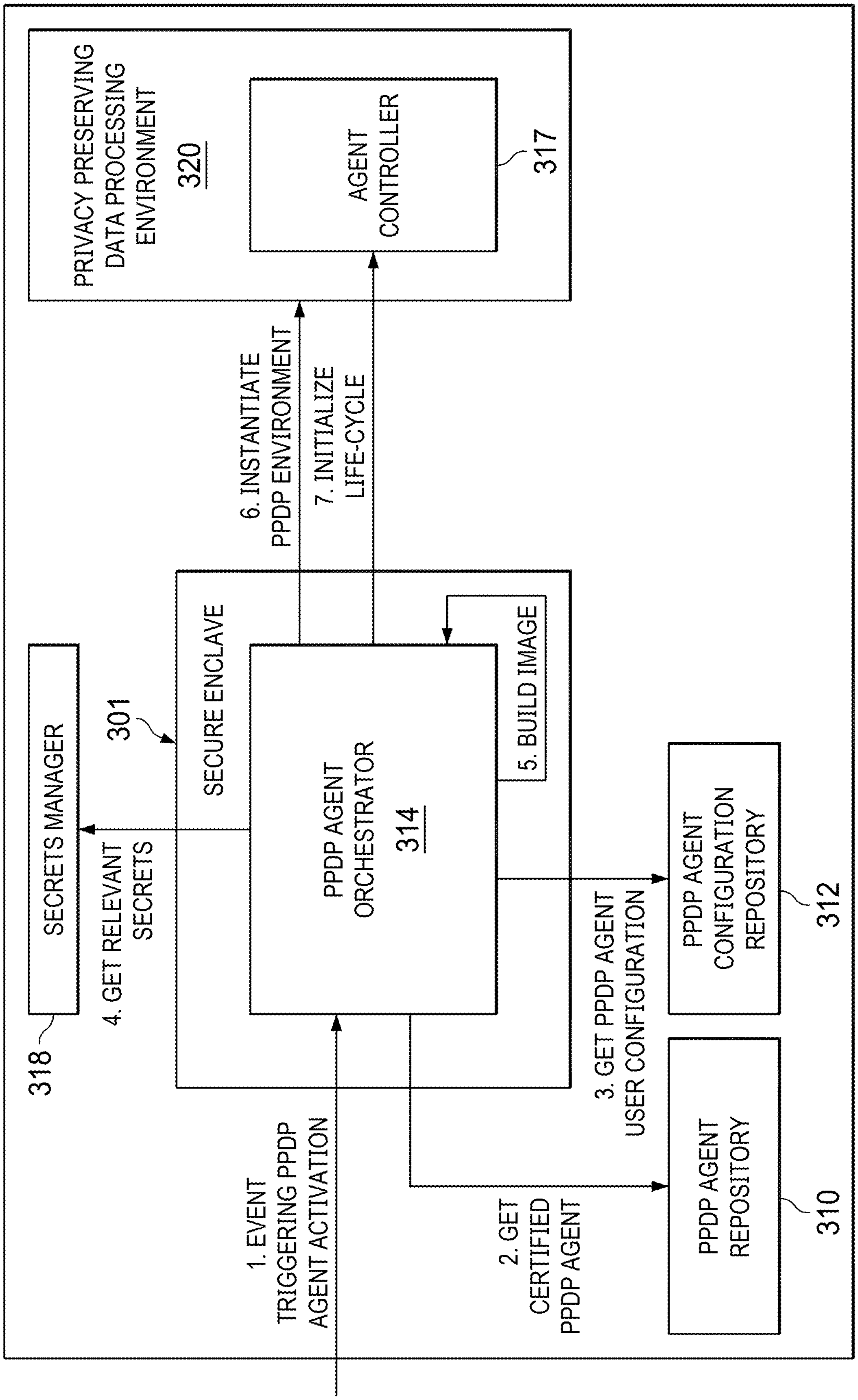
FIG. 3 depicts the activation of the PPDP Environment by a PPDP Agent Orchestrator.

FIG. 3 depicts activation of a PPDP Environment for the certified and configured PPDP Agent. As depicted, the activation is carried out by the PPDP Agent Orchestrator (AO) 314. The PPDP AO must execute within a secure enclave 301. This protects all information processed by the PPDP AO from insider threats and ensures that PPDP Agent User secrets are not disclosed to anybody. The activation process includes a set of steps. At step (1), an event triggering PPDP Agent activation is received. When the PPDP AO 314 receives an activation event for a PPDP Agent User, it begins the process to activate a PPDP Environment 320 for the appropriate PPDP Agent. As noted above, preferably the AO will only use Agents that have been registered with a trusted PPDP Agent Repository (AR) 212. If a PPDP Environment already exists for the PPDP Agent User, then another PPDP Environment will only be activated if the PPDP Agent User has enabled multiple PPDP Environments in the PPDP Agent configuration. At step (2), and in response to the event, the PPDP AO 314 retrieves the certified PPDP Agent from the PPDP Agent Repository 310, verifies the PPDP Agent Certificate, and validates it against the PPDP Agent. If validation succeeds, the process continues at step (3), wherein the PPDP AO 314 retrieves the PPDP Agent configuration from the PPDP Agent Configuration Repository 312. It then validates the PPDP Agent configuration, and the PPDP Agent security context. At step (4), and once the PPDP AO 314 has a validated PPDP Agent and configuration, it will then retrieve all the specified secrets from the Secrets Manager 318. The PPDP AO is executing in a secure enclave, so the secrets are not visible. At step (5), and using the certified PPDP Agent, configuration, security context and secrets, the PPDP AO builds an image appropriate for the underlying trusted execution environment. Examples include, without limitation, AWS® Nitro, Azure® Confidential Computing, and Anjuna® Confidential Computing. At step (6), and once the PPDP Environment image is ready, the PPDP AO creates the secure enclave for the PPDP Environment 320 using the newly created image. At step (7), and once the PPDP Environment 320 is available, the PPDP AO 314 sends a message to the Agent Controller 316 to initialize the environment life-cycle. The PPDP Environment is ready once the Data Store 130, Exfiltration Detection Service 132 and Encryption Service 134 (see FIG. 1) are ready. The Agent Controller 316 will then inform the PPDP AO that the PPDP Environment is in an Activated state.

Figure 4:
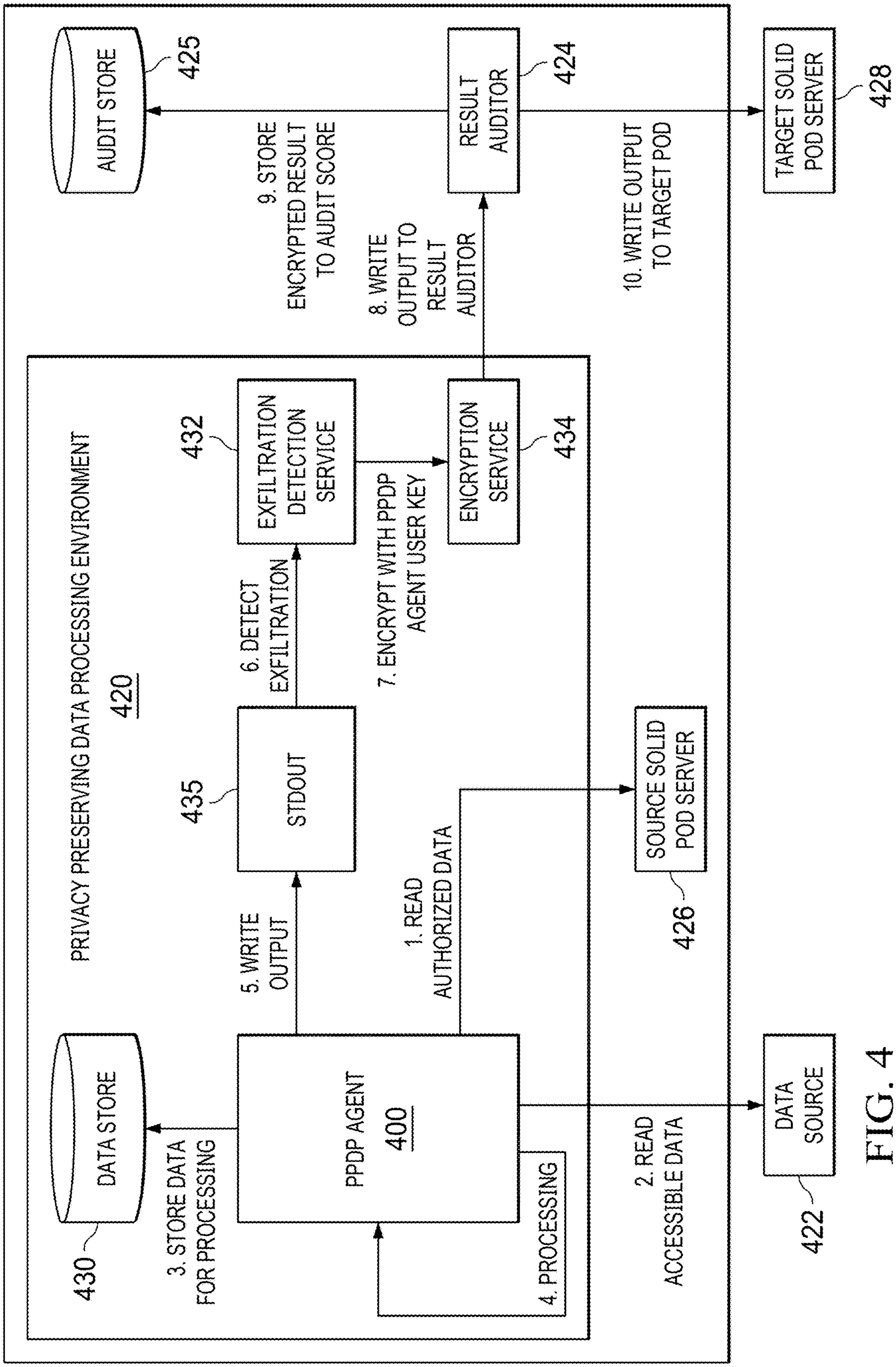
FIG. 4 depicts execution of the PPDP Agent within the PPDP Environment.

FIG. 4 depicts execution of the PPDP Agent within the PPDP Environment. The Agent Controller is responsible for executing the PPDP Agent 400 when it receives an Execute command from the PPDP Agent Orchestrator (AO). The Agent Controller will also provide all the configured secrets in the process environment for the PPDP Agent. Once the PPDP Agent is executing it can do all of the following, as depicted. Operation (1) depicts the PPDP Agent reading authorized data. This operation typically consists of reading data from any of the configured Source Solid Pod Servers (SSPS) 426. The PPDP Agent must be authorized to read the data using any method supported by the SSPS. Examples include: identity-based authorization where the PPDP Agent has authenticated using an identity that has read access to the relevant resources using a mechanism such as Access Control Policies; and Access Grant based authorization where the PPDP Agent possesses one or more Access Grants that can be used to read the relevant resources. The Access Grants can be retrieved from any location the PPDP Agent has permission to access such as an Access Grant Service or a Pod. Operation (2) depicts the PPDP Agent reading accessible data. This operation typically consists of reading data from any of the configured one or more Data Sources 422. The Data Sources may be public or the PPDP Agent may use credentials provided in the environment by the Agent Controller. Operation (3) depicts the PPDP Agent storing data for processing. Data retrieved from the SSPS and Data Sources 422 may be persisted in the Data Store 430. This data will persist for the lifetime of the PPDP Environment. Operation (4) depicts the PPDP Agent processing data in the Data Store 430; PPDP Agent may also store derived data in the Data Store 430. Operation (5) depicts the PPDP Agent writing output data to STDOUT 435. As noted above, by definition the PPDP Agent has no choice but to send its output to the STDOUT, however defined. Any data written to STDOUT 435 goes through several steps including: operation (6), which detects exfiltration. In this operation, all output from the PPDP Agent is scanned for potential personal data exfiltration. If exfiltration is detected, one or more steps can be taken including: stopping the PPDP Agent, informing the PPDP Agent User, informing the Source Solid Pod Provider, informing the owner of the Pod from which the data in question was read, and encrypting the data with the public key for the PPDP AO and sending it to the Result Auditor 424.

Assuming no exfiltration is occurring, operation (7) depicts a data encryption step. At this point, the output data is encrypted by the Encryption Service 434 using the public key provided by the PPDP Agent User. The data is now only accessible by the PPDP Agent User. Operation (8) depicts the resulting encrypted data being written to the Result Auditor 424. Operation (9) depicts storing the encrypted result in the Audit Store 425. In particular, preferably the encrypted data is signed using the private key for the Result Auditor and written to the Audit Store. The Audit Store is used during an investigation if there is a need to prove whether the PPDP Agent exfiltrated data from a Pod. Finally, operation (10) depicts the Result Auditor writing the output to a target Pod 428. This data is encrypted and only accessible to those who have access to the private key provided by the PPDP Agent User.

Figure 5:
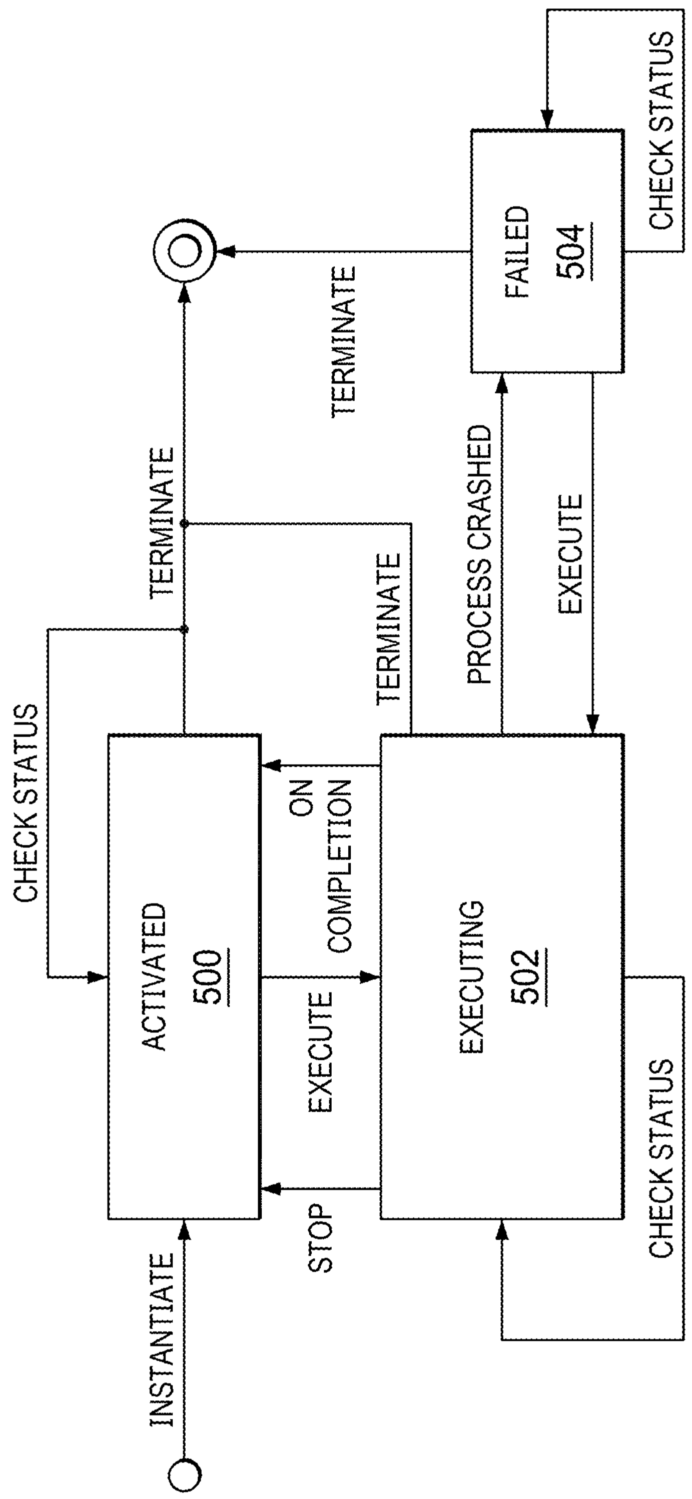
FIG. 5 depicts a representative life-cycle of the PPDP Environment.

FIG. 5 depicts a representative life-cycle of the PPDP Environment. As previously explained, this life-cycle is controlled by the PPDP Agent Orchestrator. The PPDP AO controls the life-cycle of the PPDP Agent by sending commands to the Agent Controller. The commands the Agent Controller can receive from the PPDP AO include: Instantiate, Status, Terminate, Stop and Execute. The Instantiate command resets any Agent Controller state. When the required services are in a ready state, the Environment responds with an Activated status. Upon receipt of the Status command, the Environment responds with the current state; as depicted in FIG. 5, the valid states include: Activated 500 (the environment is ready to execute the PPDP Agent), Executing 502 (the PPDP Agent is currently executing), and Failed 504 (the PPDP Agent failed during a last execution attempt. The Terminate command stops the PPDP Agent if it is executing and removes the PPDP Environment. All data in the Data Store is then lost. The Stop command kills the PPDP Agent process if it is currently executing. The PPDP Environment remains intact and the status is reset to Activated. The Execute command operates as follows.

If the current status is Activated, then execute the PPDP Agent and set the status to Executing.

If the current status is Failed, then reset the environment to an Activated status and then perform the Execute command. When the PPDP Agent is executing, the Agent Controller monitors status of the process. If the process exits successfully then the environment status is set to Activated; if the process crashes, then the environment status is set to Failed; if the Agent Controller determines that the PPDP agent is a rogue process, it will kill the process and set the status to Failed.

Artificial Intelligence (AI) Agent Support

The above-described system may be extended with Artificial Intelligence (AI) agent-based support, as is now described. Unless otherwise described, the components depicted in FIG. 6 correspond to the components with the same name or nomenclature as in the earlier figures and operate as previously described. Thus, for example, FIG. 6 depicts several Privacy Preserving Data Processing (PPDP) Environments 670, 675, 680, 685 and 690.

Figure 6:
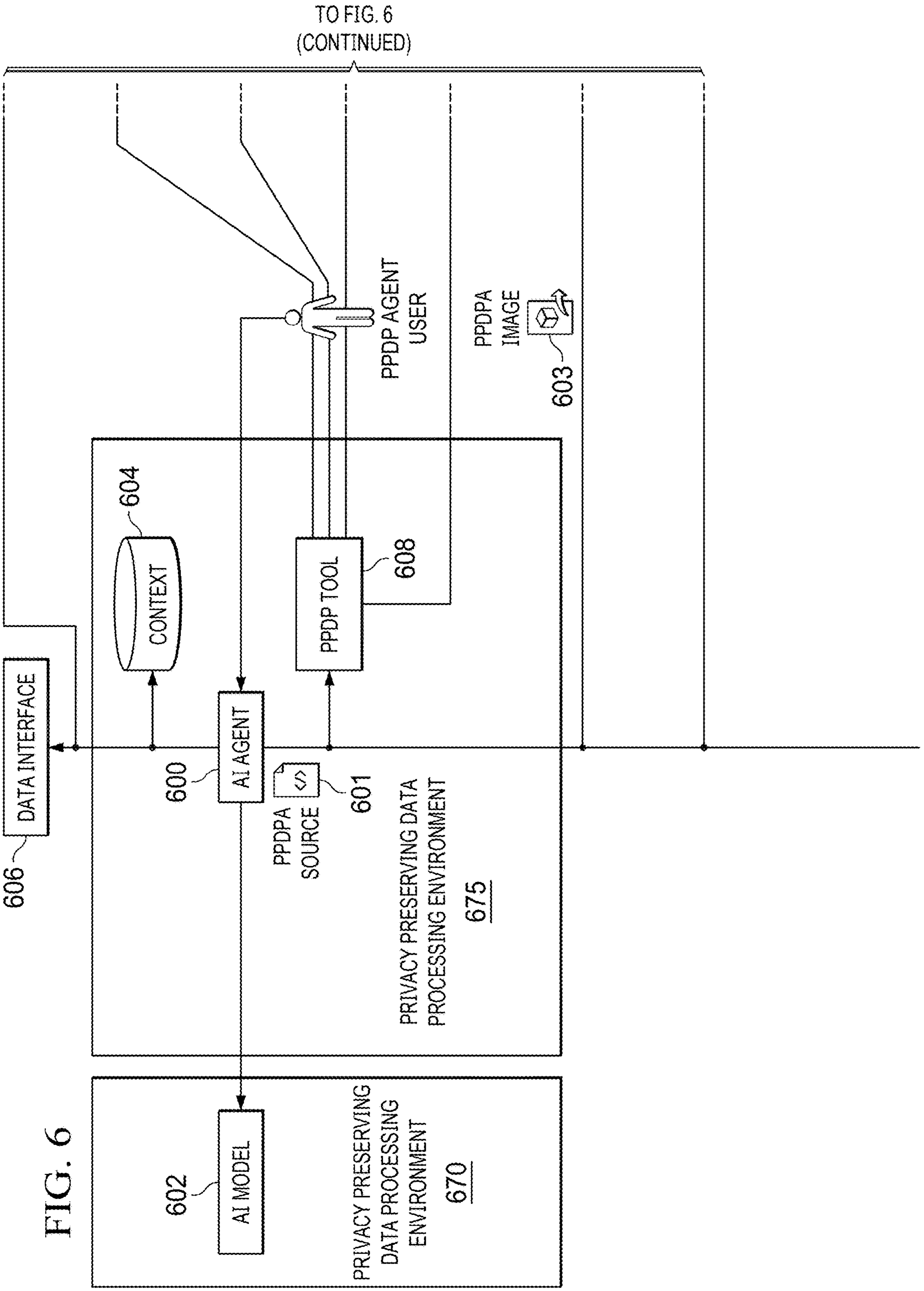
FIG. 6 depicts a variant system embodiment wherein an AI agent having a requirement to access private data in the linked data operating environment leverages a PPDP agent on its behalf.
Figure 6:
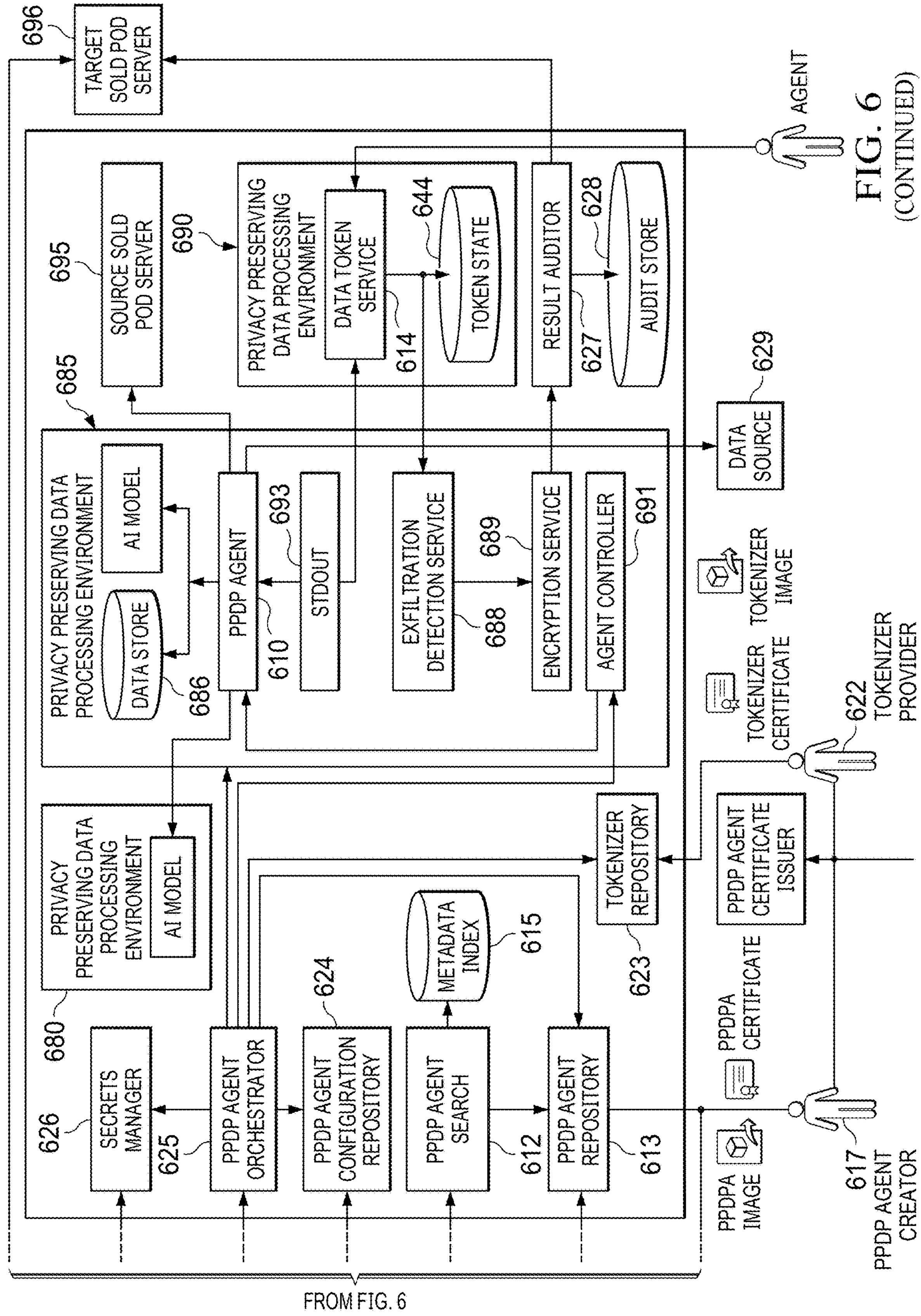

As used in this portion of the disclosure, and with reference now to FIG. 6, the following additional components have the following meaning:

AI Agent (AIA)

An AI agent (AIA) 600 is a software application that can act as an autonomous agent with its own identity, as an autonomous agent with delegated authority from another agent such as a human, or as an agent under the direction of another agent such as a human. An AI Agent typically has several mechanisms to interact with its environment, such as Tools, an AI Model, a Context, and a Data Interface. A particular AIA may have general- or domain-specific knowledge, and it may take on many forms including, without limitation, a chatbot, a generative AI, a neural network, deterministic logic, other machine learning mechanisms, or combinations thereof.

Tools

A tool extends the AI Agent's capabilities by providing a mechanism to invoke specific functionality, provide input, and gather any output.

AI Model

An AI Model 602 is a computer system designed to recognize patterns and make decisions or predictions based on data it has been trained on. Examples include, without limitation, large language models (LLMs), small language models (SLMs), decision making models, recommendation models, and combinations thereof. An AI Model 602 may be hosted or otherwise located within a PPDP Environment, such as PPDP Environment 670, 680 or 690.

Context

A Context 604 is the working memory used by the AI Agent 600. The context can store information while the AI Agent is operational.

Data Interface

A Data Interface 606 provides a mechanism for the AI Agent to communicate with systems accessible from its environment, such as IoT devices.

PPDP Tool (PPDPT)

A PPDP tool (PPDPT) 608 is a tool capable of using a PPDP Agent Search service and a PPDP Agent Orchestrator (as previously described) to locate, configure, and execute an appropriate Privacy Preserving Data Processing (PPDP) Agent (as described above) given a set of inputs describing requirements. As depicted, AIA 600, Context 604 and PPDPT 608 are executing in PPDP Environment 675.

Generated PPDP Agent (GPPDPA)

As used herein, a Generated PPDP Agent (GPPDPA) 610 is a PPDP Agent which an AI Agent (AIA) 600 dynamically generates. As used herein, a GPPDPA operates in a manner similar to that of any other Privacy Preserving Data Processing (PPDP) agent described above. Typically, and as will be described below, the GPPDPA is created to find out some information or generate an insight that requires private data but where the private data should not be exposed back to the AIA that generates it. Generally speaking, a GPPDPA is designed to execute in a Privacy Preserving Data Processing (PPDP) Environment and, to that end, can use accessible data stores, AI models, and execution logic. To this end, and in FIG. 6, the PPDP Agent 610 is shown as executing in PPDP Environment 685 that also includes a Data Store 686, an AI Model 687, an Exfiltration Detection Service 688, an Encryption Service 689, an Agent Controller 691, and a Standard Output Device (STDOUT) 693. In this example, the GPPDPA 610 (generated in accordance with the process flow shown in FIG. 8) has been configured by the AIA 600 to retrieve some private data (on the AIA's behalf) from a Source Solid Pod Server 695, to process that private data, and to generate some answer or insight that the GPPDPA then returns back to the AIA (or perhaps to a Target Solid Pod Server (TSPS) 696. In this manner, the AIA is able to continue or provide its required processing but without having the private data. Typically, and to ensure protection of the private data, all or some portion of the private data-based answer or response provided by the GPPDPA is delivered in a tokenized format.

Source code for generating a GPPDPA is depicted as PPDPA Source, namely, reference numeral 601 in FIG. 6. A binary image derived from the source code is depicted in FIG. 6 as the PPDPA Image 603.

PPDP Agent Search Service (PPDPAS)

An PPDP Agent Search Service (PPDPAS) 612 is an agent search service that uses metadata from a PPDP Agent Repository 613 to create a Metadata Index 615. When provided with requirements, e.g., by a PPDPT, the PPDPAS 612 uses the index to locate one or more semantically best PPDP Agents capable of delivering on the provided requirements. The PPDPAS 612 returns a list of zero or more PPDP Agent identifiers with descriptions and a value indicating their semantic closeness to the requirements.

Data Token Service (DTS)

A Data Token Service (DTS) 614 is a service that is used to replace private information with tokens that retain all essential information while protecting the data. When a PPDPA is registered, it can be configured to require the use of a DTS. Further, and as explained below, a type of tokenization to perform, for example, format preserving, reversible, non-reversible, and the like, also can be specified by a DTS. Preferably, and as will be described, reversible tokens can only be reversed by agents with authorization. Multiple DTS instances 614 can exist concurrently and when a PPDP Agent is registered, the specific DTS to use with that agent can be specified. This allows for custom tokenization rules to be implemented.

FIG. 6 depicts a DTS 614 located within the PPDP Environment 690, together with an associated Token State database 644. As explained in more detail below, in this example embodiment the DTS is used to tokenize private data obtained from the Source Solid Pod Server 695 by the GPPDPA 610 hosted in the PPDP Environment 685. More generally, the operation of the DTS may be carried out with respect to any PPDP agent.

As also shown in FIG. 6, the system may leverage other components including, without limitation, one or more PPDP Agent Creator(s) 617 that can create and register PPDP agents, the PPDP Agent Repository 613 for storing PPDP agents registered with the system, one or more Tokenizer Provider(s) 622 to create tokenizer(s), and Tokenizer Repository 623 for storing tokenizers. The system also includes a PPDP Agent Configuration Repository 624 for storing configuration data about PPDP agents, a PPDP Agent Orchestrator 625, a Secrets Manager 626, a Result Auditor 627, an Audit Store 628, and a Data Source 629. These latter system components were described above, e.g., in the system embodiment shown in FIG. 1, and they have the same or similar functions as was described.

As will be described below in additional detail, the above-identified components provide for extended PPDP Agent capabilities in the context of the Solid ecosystem, e.g., the ability of the system to leverage AI agents to generate and use such agents for accessing and processing private data.

Figure 7:
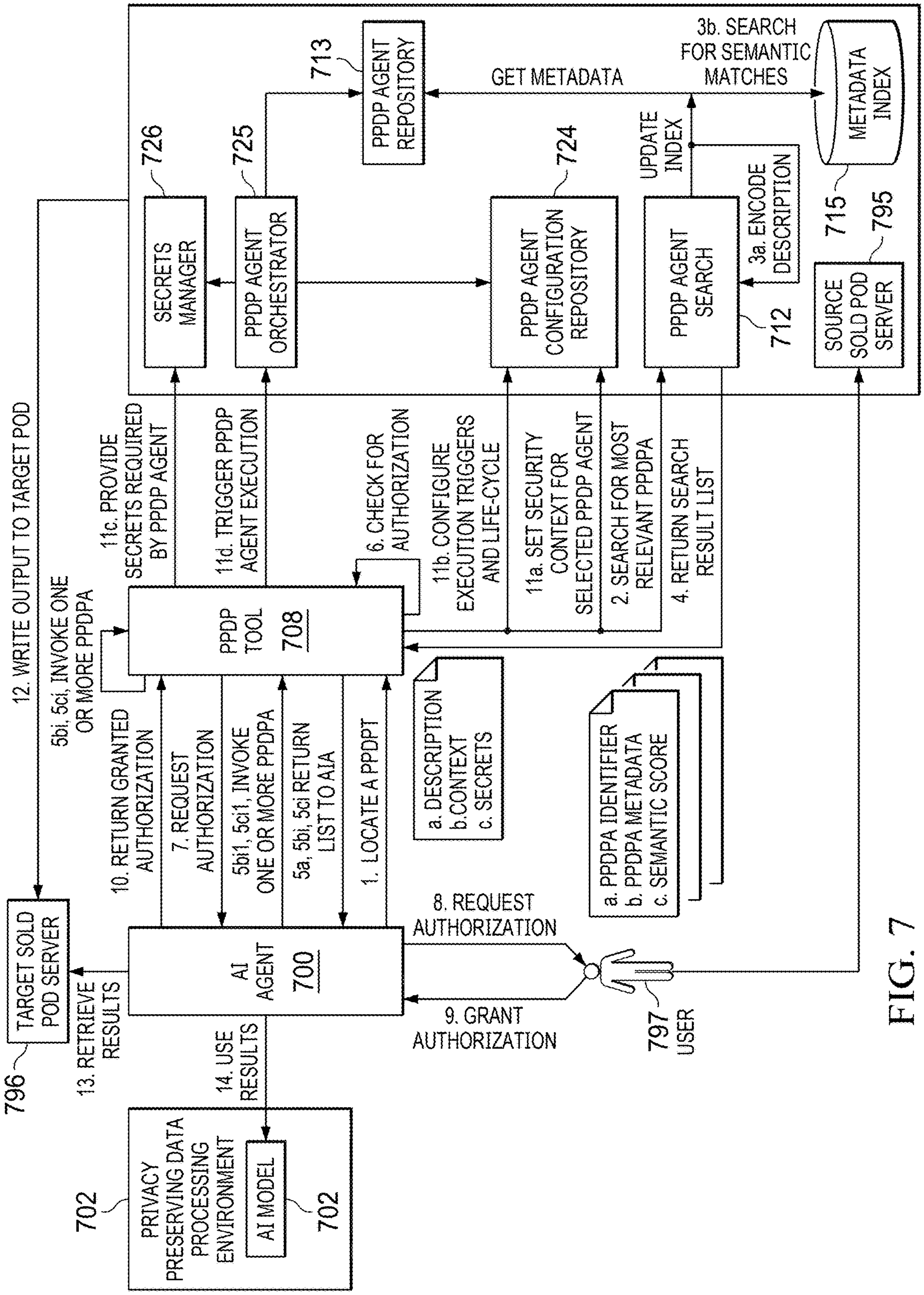
FIG. 7 depicts a representative workflow in the system depicted in FIG. 6.

With the above definitions in hand, the following provides an operating scenario involving an AIA. In particular, FIG. 7 depicts an operating scenario wherein an AIA 700 needs to process private data but does not have authorization to get access to the data. To address this need, the AIA generates or otherwise obtains a GPPDPA for this purpose. System components here include AIA 700, PPDP Environment 702 supporting AI Model 702, PPDP Tool 708, PPDPAS 712, PPDP Agent Repository 713, Metadata Index 715, PPDP Agent Configuration Repository 724, PPDP Agent Orchestrator 725, Secrets Manager 726, Source Solid Pod Server 795 and Target Solid Pod Server 796, all with the functions/operations previously described with respect to FIG. 6. The workflow proceeds as follows.

At step (1), the AIA 700 locates a PPDPT 708 and provides it with a description of the processing it wants to carry out, all relevant input from its Context 704, and any relevant secrets that may be needed for the processing. In this example, the AIA 700 is to provide results to an AI Model 702 hosted in the PPDP Environment 770. At step (2), the PPDPT 708 searches for a relevant PPDPA using the PPDPAS service 712, providing it with the description as input. At step (3), the PPDPAS service 712 encodes the description and provides the encoded description as input to a semantic search of indexed metadata in metadata index 715 from a PPDP Agent Repository 713. At step (4), the PPDPAS service 712 returns a list of zero or more entries containing a PPDPA identifier, PPDPA metadata, and a score representing a semantic "closeness" of the PPDPA metadata to the description provided by the PPDPT 708. Control then continues at step (5), wherein the PPDPT 708 checks the response. If the list is empty, at step (5) (a) the empty result is returned to the AIA 700, which then determines there are no pre-configured agents available to carry out the required processing. If, however, the list contains more than one entry, then at step 5(*b*)(*i*) the response is sent to the AIA 700 to enable the AIA to determine ((at sub-step (1)) which PPDP Agent to use or, at step 5(*b*)(*ii*) the PPDPT 708 is instructed to execute one or more PPDPAs whose score is greater than a provided value. If the list contains just one (1) entry, then the PPDPT 708 either (i) responds to the AIA, which then determines ((at sub-step (1)) whether to use the PPDPA; or (ii) the PPDPT 708 is instructed to execute the PPDPA if its score is greater than a provided value. Control then continues at step (6).

In particular, at this point in the workflow and for each PPDPA, the PPDP tool 708 checks whether the AIA already has authorization to execute the PPDPA. If authorization is required, then authorization is requested from the AIA in step (7); otherwise, control proceeds to step (11) described below. Authorization may take one or more forms including without limitation: an access grant, granted by the user to execute the PPDPA, potentially for one or more specific purposes, one or more credentials that result in authorization according to access control policies, or the like.

When control has branched to step (7), the AIA is requested to provide the list of authorizations required to execute all the relevant PPDPA. At step (8), the user is queried to obtain authorization from the user to execute the relevant PPDPA using the user's data. Authorization may be requested from the user directly, from another agent with delegated authority from the user, from the user's preferences or from an agent with access to the user's preferences, or the like. If authorization is granted, at step (9) the authorized is returned to the AIA. At step (10), the AIA 700 sends the authorization to the PPDPT 708.

At step (11), and for each PPDPA that the PPDPT invokes, the PPDPT sets a security context, sets one or more execution triggers and life-cycle, sets any required secrets, and triggers PPDP Agent execution. As each PPDPA completes, and per step (12), the result is written to a Target Solid Pod Server (TSPS) 796 via the pipeline shown in previous workflows, e.g., FIG. 1. The AIA determines that the result is available through a number of mechanisms such as: polling the TSPS 796 to check for the result, or subscribing for a notification, e.g., when the result is written to the TSPS. Notifications can be delivered in a number of ways including, without limitation, WebSockets and Webhooks.

At step (13), the AIA 700 retrieves the results from the TSPS 796. At step (14), the AIA continues and stores the result in its Context 704, and uses the results as input to other AI Models 717 or tools, or the like. FIG. 7 also depicts a user 797 associated with the AIA 700. This completes the processing in this example workflow.

Figure 8:
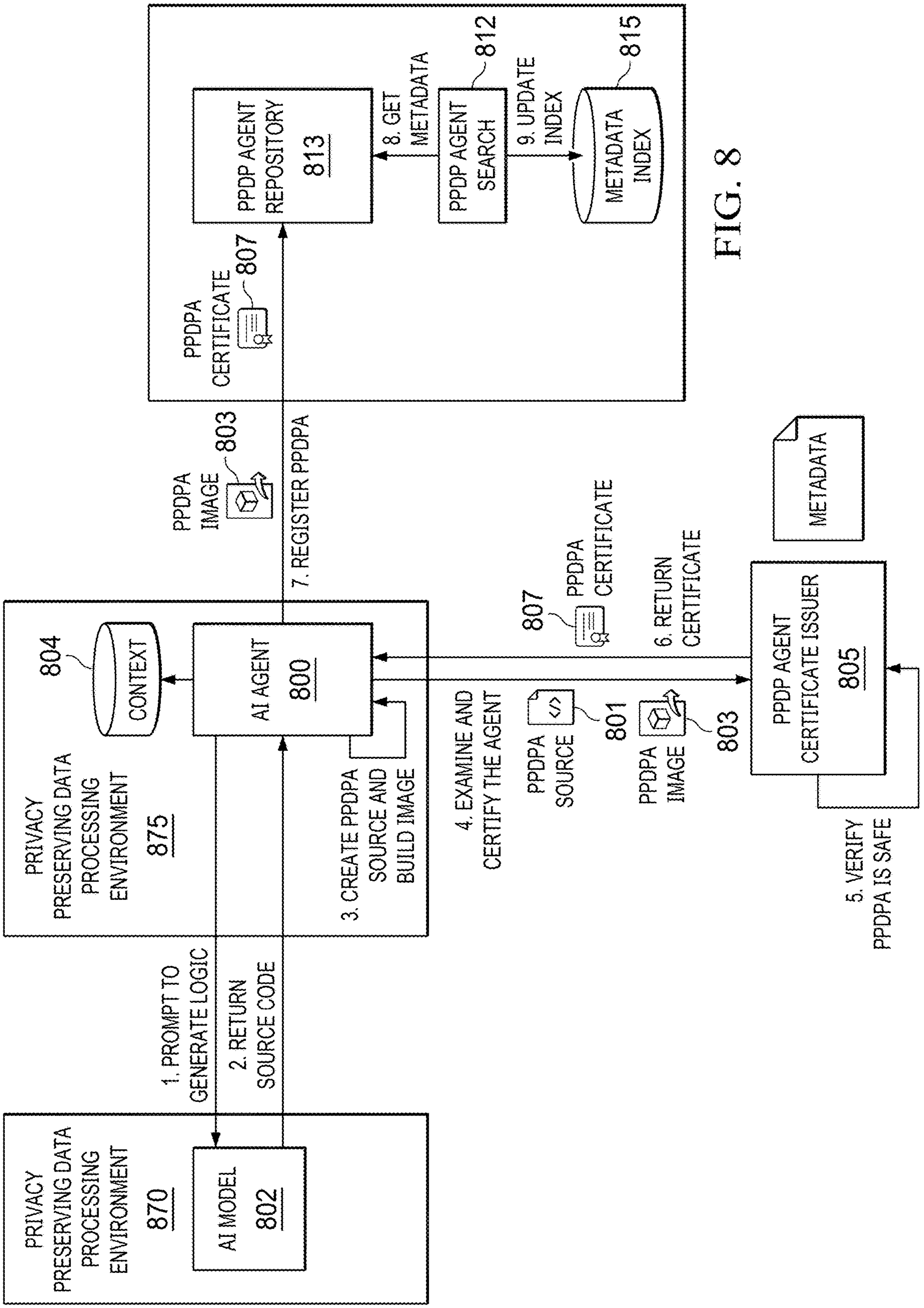
FIG. 8 depicts a representative technique for AI agent-based generation of a PPDP agent.

FIG. 8 continues to depict the scenario wherein the AIA 800 located in PPDP Environment 875 needs to process private data but does not have authorization to get access to the data. In this scenario, and after using the PPDPT (not shown), the AIA 800 determines that there are no appropriate registered PPDPAs and generates an PPDPA dynamically. To this end, and at step (1), the AIA 800 uses its context 804 and a target goal to generate a suitable prompt for an AI Model 802 to generate software source code that will be used to process the data as required. The AI Model 802 is hosted in PPDP Environment 870. At step (2), and after receiving the prompt from the AIA, the AI Model 802 generates software source code 801 for building the PPDP Agent, and returns that source code to the AIA 800. At step (3), the AIA 800 uses the generated software source code 801 to complete the process of generating the source code for a PPDPA and then builds an executable image 803 from the PPDPA source code 801. At step (4), the AIA 800 sends the PPDPA source code 801 and image 803 to a PPDPA Certificate Issuer 805. At step (5), the Certificate Issuer 805 examines the PPDPA source and image to verify that the PPDPA is safe to be executed. At step (6), and assuming the verification succeeds, the PPDPA Certificate Issuer 805 creates metadata for the PPDPA, and then creates and binds a PPDPA Certificate 807 to the PPDPA image, source code and metadata. The PPDPA Certificate 807 is then returned to the AIA 800. At step (7), the AIA 800 registers the PPDPA with a PPDPA Agent Repository 813, providing the PPDPA image 803 and PPDPA Certificate 807. At step (8), the PPDPAS 812 is notified of the newly-registered PPDPA and gets the metadata from the PPDPA Repository 813. At step (9), the PPSPAS 812 updates the Metadata Index 815 with the encoded metadata. At step (10), the AIA 800 then uses the PPDPT to execute the generated PPDPA as per the previously-described workflows, e.g., FIG. 1, and FIG. 6. This completes the processing.

Figure 9:
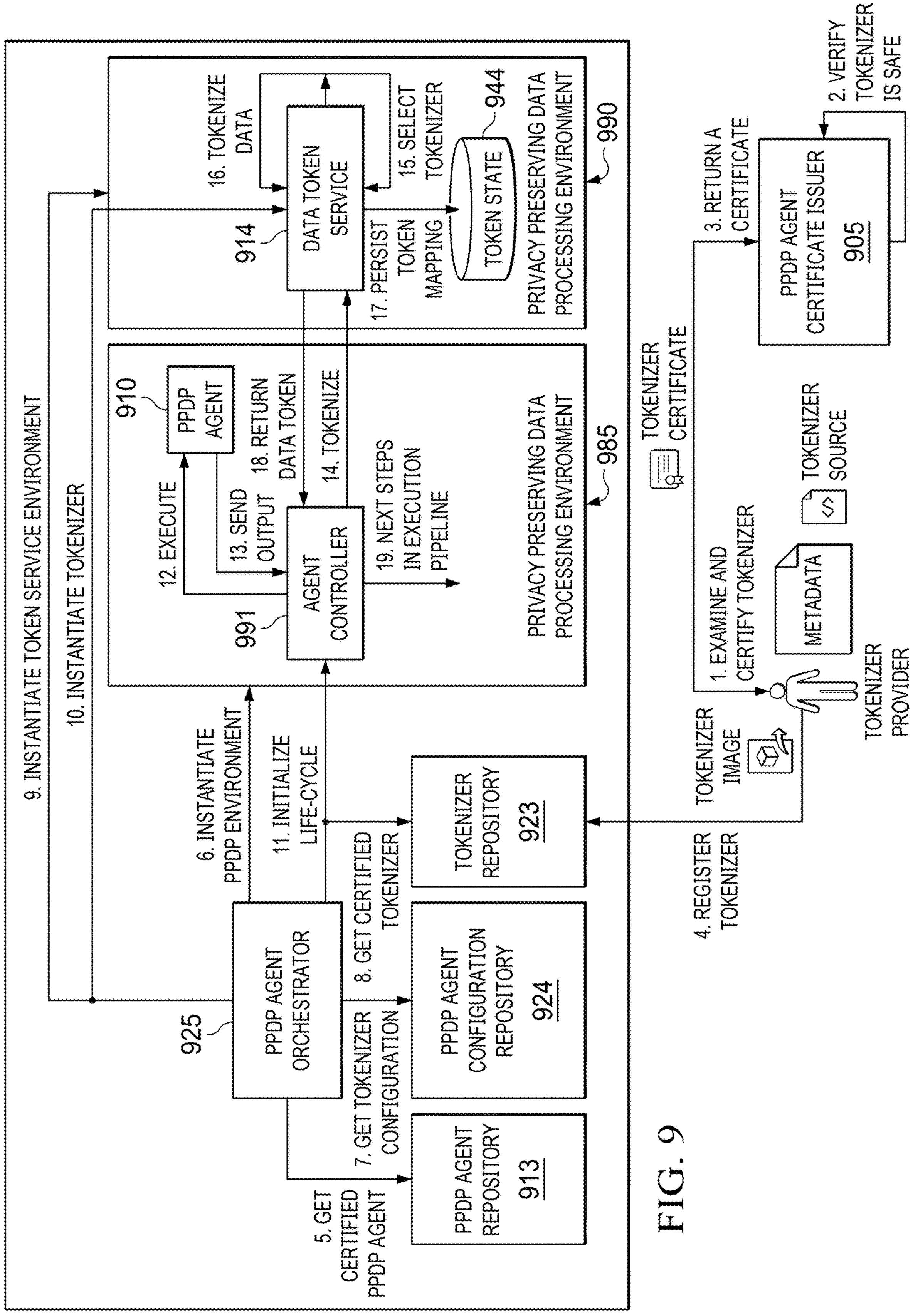
FIG. 9 depicts a representative workflow depicting tokenization processing in accordance with the variant embodiment herein.

FIG. 9 depicts how an AIA uses tokenized private data. This example utilizes PPDP Environment 985 hosting the GPPDPA 910 (or any PPDP, however generated) and the Agent Controller 991, together with PPDP Environment 990 that hosts DTS 914 and Token State database 944. Other system components used include the PPDP Agent Orchestrator 925, the PPDP Agent Repository 913, the PPDP Agent Configuration Repository 924, the Tokenizer Repository 923, and the PPDP Agent Certificate Issuer 905.

A representative use case is as follows, namely, when a PPDPA processes data and produces output data, the owner of the data may not want the PPDPA user to get access to the raw outputs. To this end, the DTS 914 is used to tokenize the output before it is made available, e.g., via the AIA, to the PPDPA user. When a PPDPA is registered such as described above, the configuration provided for the PPDPA can specify that a named tokenizer should be used to tokenize output when the PPDPA is invoked.

The following workflow sequence describes the certification and registration of a tokenizer, the binding of a PPDPA to a specific tokenizer, the instantiation of the data token service, and the user of the tokenizer in a representative embodiment. The workflow begins at step (1), wherein a Tokenizer Provider 922 submits to the PPDPA Certificate Issuer 905 source code and metadata describing the Tokenizer. At step (2), the PPDPA Certificate Issuer 905 verifies whether the Tokenizer is safe to use, and if so, issues a Tokenizer Certificate 929. At step (3), the PPDPA Certificate Issuer 905 sends the Tokenizer Certificate 929 to the Tokenizer Provider 922. At step (4), the Tokenizer Provider 922 registers the Tokenizer with the Tokenizer Repository 923, providing a tokenizer image, the metadata, and the Tokenizer Certificate 929.

When a PPDPA Agent Orchestrator 925 later needs to instantiate a PPDPA, at step (5) it retrieves the PPDPA image from a PPDPA Agent Repository 913. It also retrieves other information as depicted in the process flows described above. At step (6) the PPDPA Agent Orchestrator 925 instantiates the PPDP environment 985 or reuses an existing instantiated environment. The PPDP Environment has been described above. At step (7), the PPDPA Agent Orchestrator 925 also retrieves a tokenizer configuration from the PPDP Agent Configuration Repository 924. The tokenizer to use and its configuration are as specified in the PPDPA Agent Configuration Repository 924 when the PPDPA was registered. At step (8), the PPDPA Agent Orchestrator 925 retrieves the tokenizer image from the Tokenizer Repository 923. At step (9) the PPDPA Agent Orchestrator 925 instantiates PPDP Environment 990 as a tokenizer service environment, or it can reuse an already instantiated environment. At step (10), the PPDPA Agent Orchestrator 925 instantiates the tokenizer, or it reuses one already instantiated. At step (11), the PPDPA Agent Orchestrator 925 initializes a life-cycle with the Agent Controller 991. At step (12), and when instructed, the Agent Controller 991 executes the PPDPA, which may have been AI-generated in the manner described above. In response, and at step (13), the PPDPA then executes, and its output is gathered by the Agent Controller 991.

At step (14), the Agent Controller 991 sends the PPDPA output to the DTS 914 together with an instruction to tokenize the output using the appropriate tokenizer. At step (16), the tokenizer responds by tokenizing the PPDPA output. If the tokenizer is configured to provide reversible tokens (described in more detail below), then at step (17) the mapping of the token to the PPDPA output is persisted in a Token State database 944. At step (18), the DTS 914 returns the data token to the Agent Controller 991. At step (19), the Agent Controller 991 then continues with the next step in the workflow pipeline as described in the previous workflows, e.g., FIG. 1, or FIG. 6.

When a PPDPA produces tokenized output, the AIA uses the data token, which may be passed to third parties. At a later point, a third party or the data owner may want to reverse a reversible data token. This is achieved by sending a reverse token request to the data token service. In response, the DTS searches for the data token in the token data state store and returns the original PPDPA output to the requester. Preferably, authorization to reverse tokens is required. In particular, the agent making the request must be authorized; further, if that agent is using client software to make the request, then the client software preferably must also be authorized. The agent making the request can present an access grant (granted by the data owner), or one or more credentials that result in authorization according to one or more access control policies. Preferably, the authorization grant is for the data to which the data token maps. Further, preferably the client software must present an identifier, and that identifier is one that allows access to the DTS. The data mapping as represented by the mapping is managed according to a life-cycle, after which it is deleted or otherwise expired.

Enabling Technologies

As noted above, the techniques herein are carried out in association with a Solid ecosystem. According to the Solid Protocol, a data pod is a place for storing resources, with mechanisms for controlling who can access what. A Solid application (app) is an application that reads or writes data from one or more storages. A Uniform Resource Identifier (URI) provides the means for identifying resources. A resource is the target of an HTTP request identified by a URI. A container resource is a hierarchical collection of resources that contains other resources, including containers. A root container is a container resource that is at the highest level of the collection hierarchy. Resource metadata encompasses data about resources described by means of RDF statements. An agent is a person, social entity, or software identified by a URI; e.g., a WebID denotes an agent. An owner is a person or a social entity that is considered to have the rights and responsibilities of a data storage. An owner is identified by a URI, and implicitly has control over all data in a storage. An owner is first set at storage provisioning time and can be changed. An origin indicates where an HTTP request originates from. A read operation entails that information about a resource's existence or its description can be known. A write operation entails that information about resources can be created or removed. An append operation entails that information can be added but not removed.

Generalizing, one or more functions of the above-described system may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines.

More generally, the Solid Ecosystem comprises a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines. As used herein, the notion of a "user" or a "Solid user" includes an individual user, a group of users, an organization, a device or system, or some combination thereof.

Large Language Models (LLMs), diffusion models, and similar "generative" AI technologies enable the generation of synthetic output based upon training data. The generated output can be used for a wide range of tasks, from completing or writing new natural language text for the user, creating images based upon prompts, summarizing documents, writing poetry and creative works, patching and/or extending images, and much more. More formally, a "language model" is a probabilistic model of sequences. In the case of natural language, language models typically describe the probability of sentences or documents. Being simply probabilistic models, language models can take on many specific incarnations, e.g., column frequencies in multiple sequence alignments, Hidden Markov Models, and deep neural networks. A language model is a type of "generative model," which is a model of a data distribution, $p(X)$, joint data distribution, $p(X, Y)$, or conditional data distribution, $p(X|Y=y)$. It is usually framed in contrast to discriminative models that model the probability of the target given an observation, $p(Y|X=x)$.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, as well as improvements to various technologies, all as described.

In an alternative embodiment, an Agent is configured to self-certify, or an Agent may arrive into to the system pre-certified by a trusted third party or with a digital signature or the like that indicates that the creator of the Agent is implicitly trusted.

Having described the subject matter, what is claimed is as follows.

The invention claimed is:

1. A method for privacy preserving data processing in a linked data operating environment wherein applications have secure and permissioned access in an interoperable manner to data that is stored in one or more online data stores, comprising:

in association with an Artificial Intelligence (AI) agent that has a requirement to process private data in the linked data operating environment but lacks an authorization to obtain access to that private data, instantiating a privacy preserving data processing (PPDP) agent for use by the AI agent to access and process the private data on behalf of the AI agent; and executing the PPDP agent within a secure PPDP environment over a configured security context and life-cycle of the PPDP agent, and providing a response to the AI agent, wherein the response is an answer or insight that does not include the private data;

the AI agent processing the response.

2. The method as described in claim 1, wherein the AI agent is one of: an autonomous agent with an identity unique to the autonomous agent, an autonomous agent with a delegated authority from another agent, or an autonomous agent under direction and control of another agent.

3. The method as described in claim 1, wherein the AI agent receives given data as input, invokes a specific function, and generates an output based on the response provided by the PPDP agent.

4. The method as described in claim 1, wherein the PPDP agent is generated by issuing a prompt to an AI model, and in response receiving source code from which an image of the PPDP agent is derived.

5. The method as described in claim 1, wherein executing the PPDP agent includes processing the private data from a given online data store, replacing private information in a PPDP agent output with a data token, and providing the response back to the AI agent.

6. The method as described in claim 1, wherein the AI agent generates the PPDP agent dynamically.

7. The method as described in claim 1, further including terminating the PPDP agent and closing the secure PPDP environment responsive to closing of the PPDP agent life-cycle or upon occurrence of a given event.

8. The method as described in claim 1, wherein the AI agent comprises a domain-specific knowledge base.

9. The method as described in claim 1, further including one of: generating the PPDP agent, certifying the PPDP agent, registering the PPDP agent, and orchestrating the PPDP agent.

10. The method as described in claim 1, wherein the PPDP agent is configured to obtain the private data and generate an insight based on the private data.

11. The method as described in claim 1, wherein the PPDP agent is one of a network of PPDP-enabled agents.

12. The method as described in claim 1, wherein the linked data operating environment is Solid.

13. The method as described in claim 1, wherein the PPDP agent is one of a set of PPDP agents, and further including the AI agent locating the PPDP agent from a search of the set of PPDP agents.

14. The method as described in claim 13, wherein the PPDP agent located from the search has a given semantic relationship with a set of requirements defined by the AI agent.

15. The method as described in claim 1, further including applying a tokenization operation to the private data prior to providing the response to the AI agent.

16. The method as described in claim 15, wherein the tokenization operation is one of: a format preserving token operation, a reversible token operation, and a non-reversible token operation.

* * * * *